(12) United States Patent
Drudis et al.

(10) Patent No.: US 8,108,266 B2
(45) Date of Patent: Jan. 31, 2012

(54) METHODS FOR PROVIDING SECURE ECOMMERCE TRANSACTIONS

(75) Inventors: Antoni Drudis, Saratoga, CA (US); Dominique Sandraz, Palo Alto, CA (US); Paul A. Serra, Nashua, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1102 days.

(21) Appl. No.: 11/699,149

(22) Filed: Jan. 29, 2007

(65) Prior Publication Data

US 2008/0183590 A1    Jul. 31, 2008

(51) Int. Cl.
G06Q 30/00    (2006.01)
(52) U.S. Cl. ........ 705/26.42; 705/30; 705/44; 705/26.1; 705/27.1
(58) Field of Classification Search .................... 705/26, 705/27, 30, 44, 26.42
See application file for complete search history.

(56) References Cited

U.S. PATENT DOCUMENTS

| | | | |
|---|---|---|---|
| 5,732,400 A | 3/1998 | Mandler et al. | |
| 6,006,200 A * | 12/1999 | Boies et al. ................ | 705/26.42 |
| 6,714,918 B2 | 3/2004 | Hillmer et al. | |
| 6,859,833 B2 | 2/2005 | Kirsch et al. | |
| 6,970,852 B1 | 11/2005 | Sendo et al. | |
| 7,069,249 B2 | 6/2006 | Stolfo et al. | |
| 7,089,208 B1 | 8/2006 | Levchin et al. | |
| 7,191,151 B1 | 3/2007 | Nosek | |
| 7,249,094 B2 | 7/2007 | Levchin et al. | |
| 7,430,537 B2 | 9/2008 | Templeton et al. | |
| 7,475,043 B2 | 1/2009 | Light et al. | |
| 7,533,064 B1 | 5/2009 | Boesch | |
| 7,536,336 B1 | 5/2009 | Guinan | |
| 7,617,125 B1 | 11/2009 | Light et al. | |
| 7,693,796 B2 | 4/2010 | Light et al. | |
| 7,742,985 B1 | 6/2010 | Digrigoli et al. | |
| RE41,619 E | 8/2010 | Boesch et al. | |
| 2001/0037290 A1 * | 11/2001 | Lai ................................. | 705/39 |
| 2003/0105672 A1 * | 6/2003 | Epstein et al. ................. | 705/26 |
| 2005/0044014 A1 * | 2/2005 | Tilis et al. ....................... | 705/30 |
| 2006/0106738 A1 | 5/2006 | Schleicher | |
| 2006/0131390 A1 * | 6/2006 | Kim .............................. | 235/380 |
| 2006/0149665 A1 | 7/2006 | Weksler | |
| 2006/0235758 A1 | 10/2006 | Schleicher | |
| 2006/0242026 A1 * | 10/2006 | Crespo et al. .................. | 705/26 |
| 2006/0294025 A1 | 12/2006 | Mengerink | |
| 2008/0059329 A1 * | 3/2008 | Luchene et al. ................ | 705/26 |
| 2011/0040650 A1 * | 2/2011 | Johnson ..................... | 705/26.42 |

OTHER PUBLICATIONS

Internet Archive Wayback Machine Screen Shot of PayPal.com dated Sep. 18, 2006, 2 pages.
PCT Search Report~International Application No: PCT/US2008/051770~International Filing Date: Jan. 23, 2008~pages.

* cited by examiner

Primary Examiner — Yogesh C Garg

(57) ABSTRACT

A method of facilitating an eCommerce transaction between a consumer and an eCommerce merchant via a third party entity is provided. The eCommerce merchant receives a selection of goods for purchase and a first code from the consumer. The eCommerce merchant transmits at least a second code to the third party entity to request confirmation of the eCommerce transaction. The second code is at least partially derived from the first code. The eCommerce merchant receives the confirmation from the third party entity. The eCommerce merchant ships the goods only if the confirmation indicates that the consumer has approved, via the third party entity, the eCommerce transaction. The merchant is unaware of financial information belonging to the consumer and at least one of identity of the consumer and a shipping data that is specific to the consumer. The eCommerce merchant receives payment for the eCommerce transaction from the third party entity.

21 Claims, 3 Drawing Sheets

METHODS FOR PROVIDING SECURE ECOMMERCE TRANSACTIONS

BACKGROUND OF THE INVENTION

Electronic commerce (eCommerce) has become a ubiquitous tool for consumers and merchants to perform online transactions. Through the internet, eCommerce has leveled the playing field for merchants, large and small alike. A small business may, for example, effectively compete for global customers against a multi-channel retail business by setting up an eCommerce site integrating the features of a multi-channel retail business. Through eCommerce, a small merchant in a remote geographic location is no longer limited to a small pool of local consumers since physical access to a store front is no longer a requirement.

An eCommerce transaction typically transpires with a consumer browsing through the merchant's eCommerce site from the consumer's data terminal, such as a personal computer (PC), to select goods or services for online purchase. After the selections are made, the consumer may be required to login or register with the merchant's eCommerce site before the eCommerce transaction is allowed to complete. The registration process may require the consumer to enter the personal registration information, such as a name, address, telephone number, electronic mail (email) address, etc. before the consumer may be allowed to proceed to the next step in the eCommerce transaction, such as the checkout step. The consumer's registration information may be stored and maintained in a database on a server for use by the merchant.

Following the input of personal registration information, the consumer may be provided with a unique login identification (ID) and password that may be associated with the registration information. Upon subsequent visit to the eCommerce site, the consumer may login with the unique ID and password for authentication instead of going through the full re-registration process.

After the consumer has successfully logged in or registered, selected the goods or service and is ready to purchase, the consumer may be required to enter confidential financial information, such as a credit card number, the billing address, the shipping address, and any required verification data. Once the confidential financial information is confirmed by the merchant's eCommerce site, the consumer may be able to complete the eCommerce transaction.

However, concerns over online fraud, identity theft, individual privacy, or the like may lead some consumers to shun eCommerce transactions. For example, a consumer may find a product online at an attractive price but on an unfamiliar eCommerce merchant site. The barrier to an eCommerce transaction may be that the consumer may not have enough trust in the unfamiliar eCommerce merchant to provide the merchant with the personal registration or confidential financial information to complete the transaction. Since the merchant is an unfamiliar entity, the consumer also may not have the confidence that the personal registration and confidential financial information provided are adequately safeguarded against theft and/or misuse.

Current eCommerce systems and methods also suffer from other issues, which are also discussed later herein. The lack of willingness of certain segment of consumers to participate in eCommerce transactions due to the aforementioned reasons and others may lead to significant loss in sales opportunities for merchants.

SUMMARY OF INVENTION

The invention relates, in an embodiment, to a method of facilitating an eCommerce transaction between a consumer and an eCommerce merchant via a third party entity. The eCommerce merchant receives a selection of goods for purchase and a first code from the consumer. The eCommerce merchant transmits at least a second code to the third party entity to request confirmation from the third party entity of the eCommerce transaction. The second code is at least partially derived from the first code. The eCommerce merchant receives the confirmation from the third party entity. The eCommerce merchant ships the goods only if the confirmation indicates that the consumer has approved, via the third party entity, the eCommerce transaction. The merchant is unaware of financial information belonging to the consumer that is usable for conducting another transaction and at least one of identity of the consumer and a shipping data that is specific to the consumer. The eCommerce merchant receives payment for the eCommerce transaction from the third party entity.

The above summary relates to only one of the many embodiments of the invention disclosed herein and is not intended to limit the scope of the invention, which is set forth in the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF EMBODIMENTS

Figure 1:
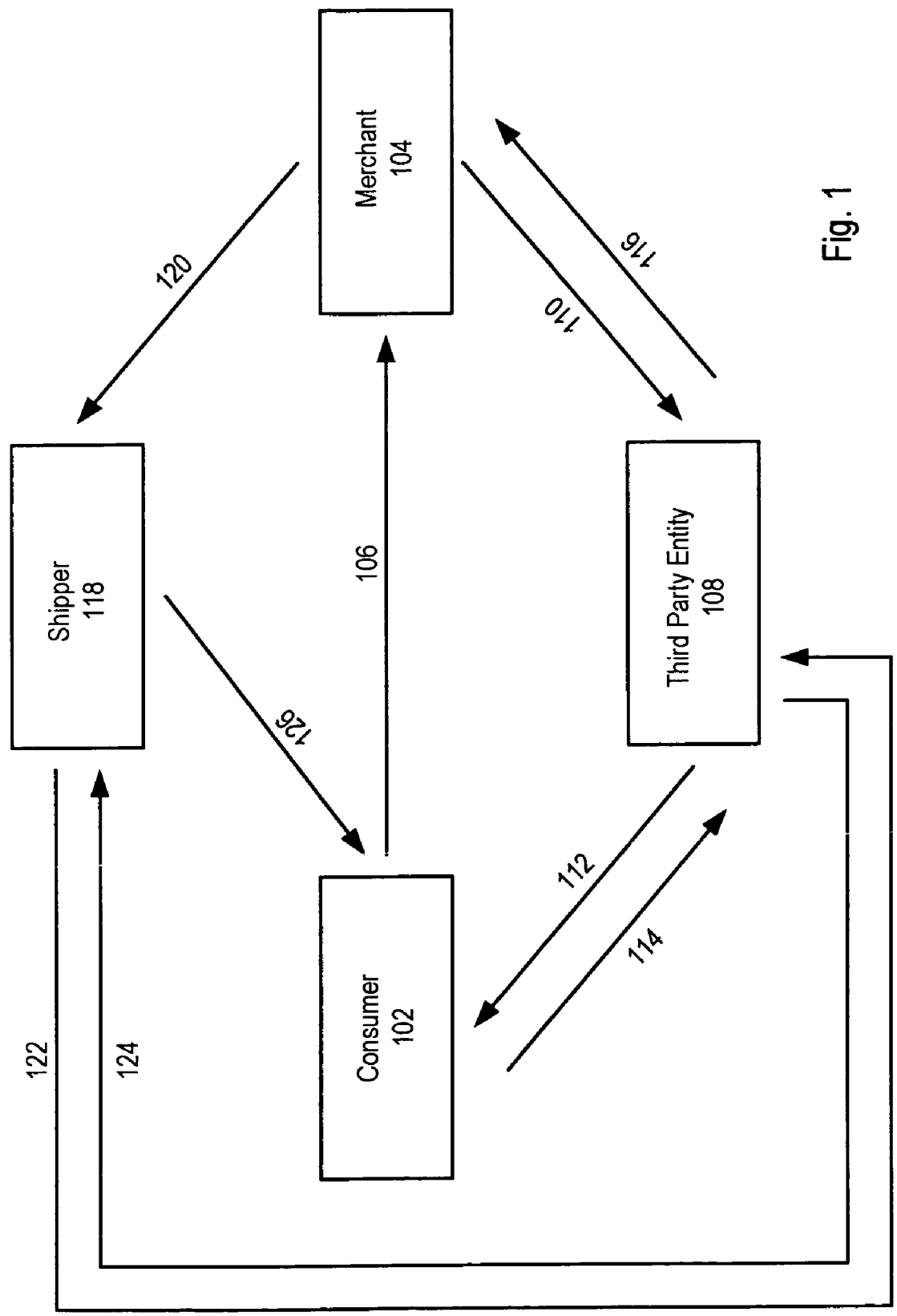
FIG. 1 shows, in accordance with an embodiment of the present invention, a simplified schematic of an eCommerce transaction flow that is designed to protect the identity and/or personal/confidential information of the consumer as well as to ensure the integrity of the eCommerce transaction.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described hereinbelow, including methods and techniques. It should be kept in mind that the invention might also cover articles of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out tasks pertaining to embodiments of the invention. Examples of such apparatus include a general-purpose computer and/or a dedicated computing device when appropriately programmed and may include a combination of a computer/computing device and dedicated/programmable circuits adapted for the various tasks pertaining to embodiments of the invention.

In accordance with embodiments of the invention, there are provided methods for conducting a transaction between a consumer and a merchant wherein a mutually trusted third party entity is employed to disassociate the consumer from the merchandise in order to protect the consumer's identity and/or personal/confidential information, and/or to confirm the transaction with the consumer by verifying the consumer's identity through an independent channel.

In an embodiment, an eCommerce transaction may transpire between a consumer and an unfamiliar merchant wherein the identity of the consumer is protected through the use of a trusted third party entity. While the transaction pending, the third party entity may verify, through an independent channel, the identity of the consumer and may also obtain confirmation from the consumer regarding the appropriateness of the eCommerce transaction. Once confirmation is obtained, the goods may be shipped by an independent entity different from the merchant thereby further disassociating the consumer from the eCommerce transaction. In this manner, the lack of trust that arises when shopping with an unfamiliar entity, the need for anonymity, and the confirmation of pricing integrity may no longer be a barrier for the consumer wishing to participate in eCommerce transactions with unfamiliar merchants.

In accordance with another embodiment of the invention, the consumer may remain anonymous, if desired, by using a third party entity in the eCommerce transaction. The third party entity, capable of verifying the identity of the consumer, may act as a broker for the eCommerce transaction between the consumer and an unfamiliar merchant. The account ID number, which may be provided to the unfamiliar merchant by the consumer and may be transmitted from the merchant to the third party entity, may be used by the third party entity to associate the consumer with the personal registration and confidential financial information of the consumer in a database. The goods from the eCommerce transaction may be shipped by an independent shipper, an entity different from the merchant, to a preferred shipping address that is different from a consumer's home or business address thereby further disassociating the consumer from the transaction.

The features and advantages of the invention may be better understood with reference to the figures and discussions that follow. FIG. 1 shows, in accordance with an embodiment of the present invention, a simplified schematic of an eCommerce transaction flow that is designed to protect the identity and/or personal/confidential information of the consumer as well as to ensure the integrity of the eCommerce transaction. A consumer 102 may, after browsing and selecting, place an order in step 106 on a merchant 104 eCommerce site, wherein the merchant may be an unfamiliar entity. In step 106, consumer 102 may provide merchant 104 with transaction information such as account ID number, shipping method, selected goods and/or services, and dollar amount in accordance with an embodiment of the invention. As will be discussed later herein, the account ID number (or alphanumeric or cryptographic code) represents an account code set up between the consumer and the trusted third party entity.

In the implementation of FIG. 1, merchant 104 may receive the transaction information from consumer 102 in step 106. While the transaction is pending, merchant 104 may send in step 110 the transaction information from consumer 102, to a third party entity 108 responsible for validating a first code, i.e., the account ID number of consumer 102. As the term is employed herein, a first code may be an account ID number to associate with the consumer in a database. Alternatively, while the transaction is pending, merchant 104 may send in step 110 a second code instead of the first code to third party entity 108. As the term is employed herein, a second code may be information at least partially derived from the first code or the first code.

Third party entity 108 represents a trusted entity in whom consumer 102 has confidence that the personal registration and confidential financial information may not be used in a fraudulent way and may be protected in such a way to minimize identity theft. Third party entity 108 may verify the account ID number of consumer 102 to associate the consumer with personal and confidential information that may have been provided by consumer 102 in the database maintained by and accessible to third party entity 108. The database may contain information provided by consumer 102 to third party entity 108 such as name, address, mailing address, telephone number, email address, credit card number, billing address, banking number, and the like.

In contrast to legacy eCommerce transaction, steps 106 and 110 do not provide merchant 104 with the personal registration or confidential financial information of consumer 102. Merchant 104 is unaware of financial information belonging to consumer 102 that is usable for conducting another eCommerce transaction. The barrier to eCommerce transaction with an unfamiliar entity may be removed because this personal registration and/or confidential information is held by third party entity 108, acting as a broker, who is a trusted and familiar entity to consumer 102. Hence, consumer 102 may shop with more confidence even though merchant 104 may be an unfamiliar entity since no personal registration or confidential financial information has to be submitted to an unfamiliar eCommerce merchant 104.

In accordance with an embodiment of the invention, third party entity 108 may contact consumer 102 in step 112 after receiving transaction information from merchant 104 to get a confirmation of the transaction step 114 from consumer 102. Third party entity 108 may contact consumer 102 through a channel physically different from the original channel to verify the identity of consumer 102 to minimize fraudulent practices such as identity theft.

Consider the situation wherein, for example, a confirmation message may be set up by consumer 102 with third party entity 108 such that a notification without any response required may be used for a low dollar purchase. A notification with response within a specified time may be required for transactions exceeding a specified dollar amount or the transaction may be voided if there is no response within the specified time. For a larger dollar transaction, an interactive response may be required with the confirmation message or else the transaction may be voided. The verification may be performed as mentioned previously, through a channel physically different from original channel. For example, the verification channel may be a telephone network or a data network in accordance with an embodiment of the invention.

Furthermore, in accordance with an embodiment of the invention, the ID of consumer 102 may be further verified in the confirmation step. In an embodiment, consumer 102 may receive a confirmation request from third party entity 108 to accept the charge for the transaction and/or provide the optional verification. For example, consumer 102 may provide a unique password to verify the account ID number. In another example, third party entity 108 may employ automated speech pattern recognition software to match the voice of consumer 102 on the telephone with the voice data from the database. One skill in the art would appreciate that given the disclosure herein, alternative authentication method(s) may be employed to verify consumer 102 identity to associate the proposed transaction with confidential information in the database.

In contrast to prior art eCommerce transaction techniques, the verification and confirmation of steps 112 and 114 may provide consumer 102 with assurance of pricing integrity, since consumer 102 is made fully aware of the pending charge before authorizing the transaction. Furthermore, the optional ID verification may provide consumer 102 with enhanced protection from fraudulent uses by identity thieves. Hence, consumer 102 may conduct eCommerce transactions with more confidence with unfamiliar entities because third party entity 108, acting as a broker, is performing the verification of consumer ID and transaction charge.

In an embodiment of the invention, third party entity 108, after performing the verification and receiving confirmation from consumer 102, may send in step 116 confirmation and shipping codes to merchant 104. As used herein, confirmation code may be either an approval or a denial of the transaction charge. Depending on the situation, a denial of the transaction may be due to third party entity 108 unable to verify consumer 102 ID, inappropriate charges by merchant 104, mistakes in eCommerce transaction, fraudulent use through identity theft, or other fraudulent practices. Consider the situation wherein, for example, merchant 104 receives a confirmation code that is a denial of the transaction charge. Merchant 104 may then void the transaction thus protecting consumer 102 from the level of frustration that may be experienced with prior art eCommerce transactions.

Consider the case wherein, for example, consumer 102 approves the transaction charge. In accordance with an embodiment of the invention, consumer 102 may be charged the approved transaction amount (plus any applicable charge imposed by third party entity 108 for their service) by third party entity 108 using the preferred payment method from the database containing confidential financial information. Merchant 104 may be paid by third party entity 108 for the eCommerce transaction of consumer 102. Hence, consumer 102 may shop with high level of confidence even with an unfamiliar entity since the confidential information does not have to be provided to an unfamiliar entity to accomplish the eCommerce transaction.

Merchant 104, in an embodiment, may receive confirmation and shipping codes from third party entity 108 that consumer 102 has approved the transaction charge. Merchant 104 is unaware of at least one of the identity of consumer 102 and a shipping address that is specific to consumer 102. Merchant 104 may send in step 120 goods and the shipping code to an external shipper 118. Shipper 118 may send in step 122 the shipping code to third party entity 108 to request a shipping address. Third party entity 108 after receiving the shipping code from shipper 118 may send in step 124 consumer 102 preferred shipping address to shipper 118. Shipper 118 may then send goods to the shipping address selected by consumer 102 and keep on file with third party entity 108.

In contrast to prior art eCommerce transaction technique, consumer 102 may shop with complete anonymity and be disassociated from the eCommerce transaction. Merchant 104 is not provided with any information on consumer 102 beside the account ID number, which may be generated by third party entity 108 for consumer 102 for each transaction. Merchant 104 is not rendered vulnerable to payment collection risks for goods or service provided to an anonymous customer since third party entity 108 in effect guarantees that merchant 104 would be paid using the financial arrangement previously setup between consumer 102 and merchant 104 once consumer 102 approves the transaction. Hence, third party entity 108, acting as a broker, may provide consumer 102 with eCommerce transaction anonymity while shopping with unfamiliar merchant 104 and provide payment collection assurance for merchant 104.

Figure 2:
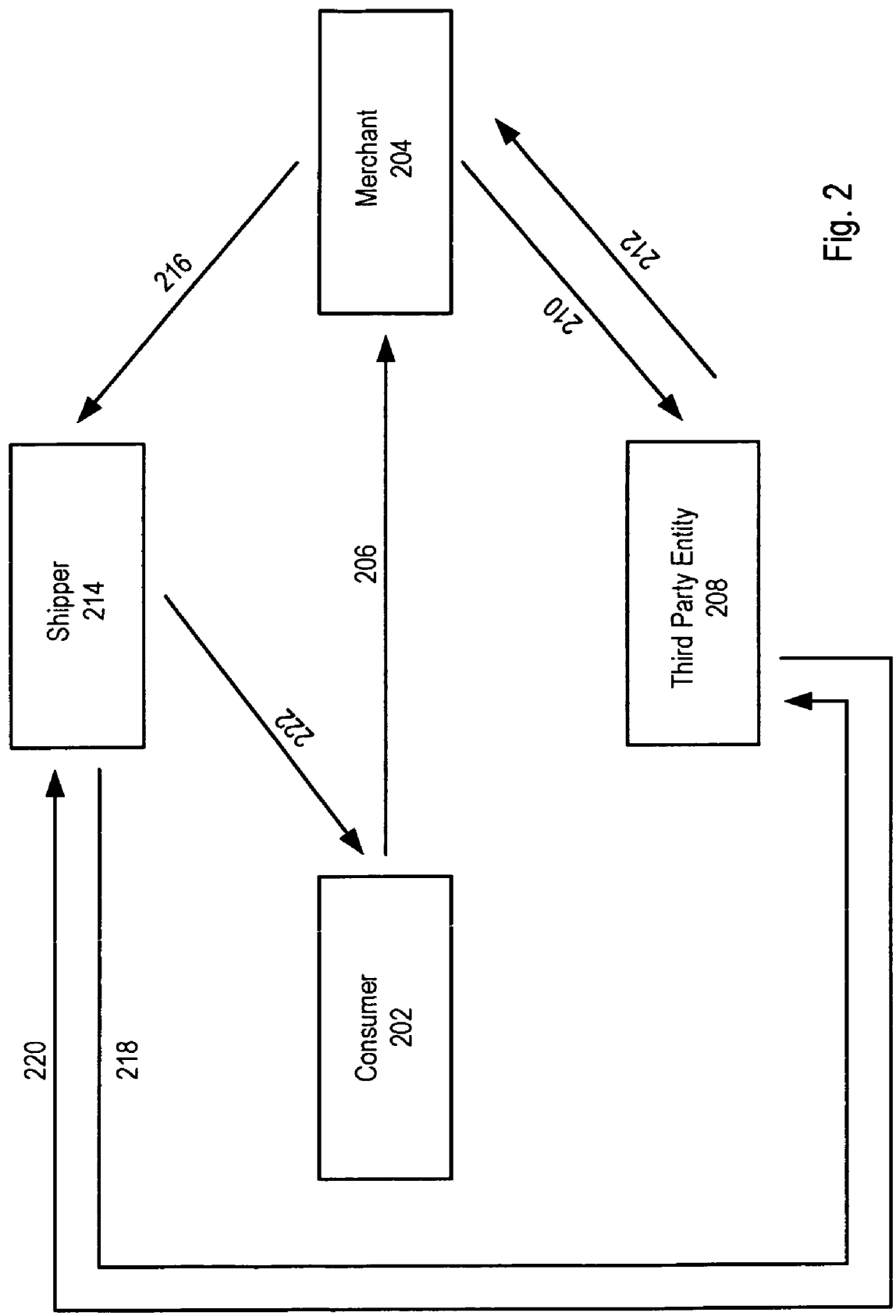
FIG. 2 shows, in accordance with one embodiment of the invention, a simplified schematic of an eCommerce transaction configured to protect the anonymity of consumers through a third party entity capable of verifying the identity of the consumer.

FIG. 2 shows, in accordance with one embodiment of the invention, a simplified schematic of an eCommerce transaction configured to protect the anonymity of consumers through a third party entity capable of verifying the identity of the consumer. A consumer 202 may place an order in step 206 on a merchant 204 eCommerce site, wherein the merchant may be an unfamiliar entity. In step 206, consumer 202 may provide merchant 204 with transaction information such as account ID number, shipping method, selected goods and/or services, and dollar amount in accordance with an embodiment of the invention.

Merchant 204 may send in step 210, while the transaction is pending, the transaction information provided by consumer 202 in step 206 to a third party entity 208, who is responsible for validating a first code, i.e., the account ID number of consumer 202 in accordance with an embodiment of the invention. Alternatively, while the transaction is pending, merchant 204 may send in step 210 a second code instead of the first code to third party entity 208. Third party entity 208 may be a trusted entity in whom consumer 202 has confidence that his personal registration and confidential financial information is secured and properly safeguarded. Third party entity 208 may verify the account ID number of consumer 202 to associate the consumer with personal and confidential information that has been provided by consumer 202 in the database. Personal and confidential information provided by consumer 202 to third party entity 208 may include, for example, name, address, mailing address, telephone number, email address, credit card number, billing address, banking number, and the like.

In contrast to legacy eCommerce transaction techniques, steps 206 and 210 do not provide merchant 204 with the personal registration and/or confidential financial information of consumer 202. Merchant 204 is unaware of financial information belonging to consumer 202 that is usable for conducting another eCommerce transaction. The barrier to eCommerce transaction with an unfamiliar entity may be removed because third party entity 208, acting as a broker, is a trusted and familiar entity to consumer 202.

In accordance with an embodiment of the invention, the third party entity may take the account number and verify the ID of consumer 202. After the ID of the consumer 202 has been associated with the confidential information in the database, third party entity 208 may send in step 212 verification and shipping codes to merchant 204. Third party entity 208 may charge consumer 202 the transaction amount using the preferred payment method from the database containing confidential financial information. Merchant 204 may then be paid by third party entity 208 for the eCommerce transaction of consumer 202. Hence, consumer 202 may shop with high level of confidence even with an unfamiliar entity since confidential information does not have to be provided to unfamiliar entity for eCommerce transaction.

In step 216, merchant 204 may send the goods and the shipping code to shipper 214. Merchant 204 is unaware of at least one of identity of consumer 202 and a shipping address that is specific to consumer 202. In step 218, shipper 214 may send the shipping code to third party entity 208 requesting the preferred shipping address for consumer 202. In step 220, third party entity 108 may send to shipper 214 consumer 202 preferred shipping address. Shipper 214 may send in step 222 the goods to consumer 202 preferred shipping address.

In contrast to prior art eCommerce transaction, consumer 202 may shop with complete anonymity and be disassociated from the eCommerce transaction. Merchant 204 is not provided with any information on consumer 202 beside the account ID number and the shipping code, which may be one-time use codes generated by third party entity 208 for consumer 202 for each transaction.

Consider the situation wherein, for example, shipper 214 may also be third party entity 208 or vice versa, i.e., wherein third party entity 208 and shipper 214 may be the same entity, the eCommerce transaction process may be vastly simplified. Consumer 202 may send in step 206 account ID number, goods or service selected, and shipping method to merchant 204. Merchant 204 may send in step 216 the transaction information from consumer 202 to shipper 214, who may perform both functions as third party entity broker and shipper. Shipper 214 may verify consumer 202 account ID number, confirm the transaction with the consumer, and may send in step 222 the goods or service to consumer 202 preferred shipping address. Although, the process may be simplified in the case where the third party entity and the shipper may be the same, consumers may still shop with complete anonymity and confidence.

Figure 3:
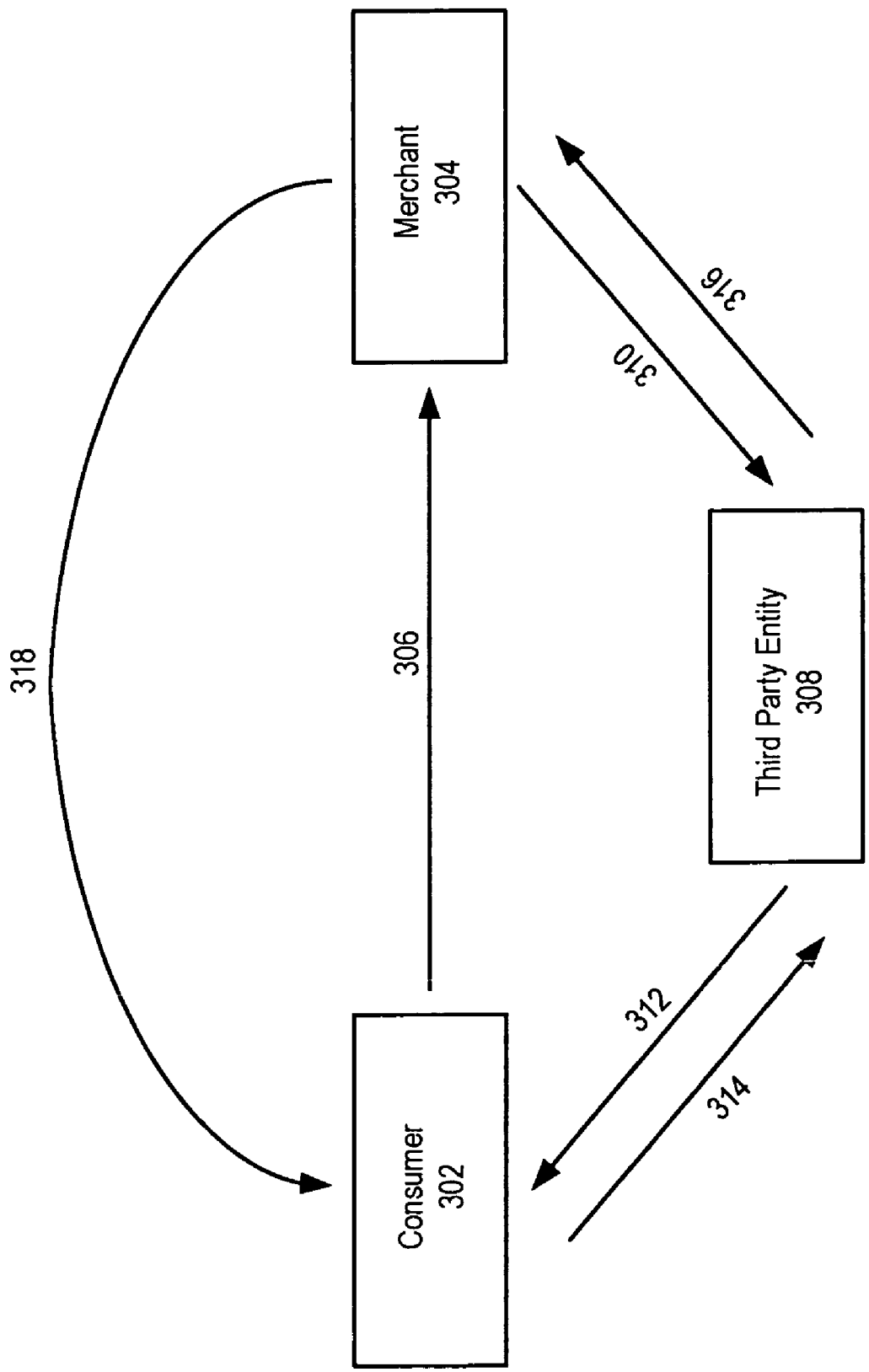
FIG. 3 shows, in accordance with an embodiment of the invention, a simplified schematic of an eCommerce transaction wherein shipping anonymity is not required.

FIG. 3 shows, in accordance with an embodiment of the invention, a simplified schematic of an eCommerce transaction wherein shipping anonymity is not required. In this case, the third party entity functions to protect the consumer personal and confidential information as well as to confirm the transaction with the consumer.

In the implementation of FIG. 3, merchant 304 may receive the transaction information from consumer 302 in step 306. While the transaction is pending, merchant 304 may send in step 310 the transaction information from consumer 302, to a third party entity 308 responsible for validating a first code, i.e. the account ID number of consumer 302. Alternatively, while the transaction is pending, merchant 304 may send in step 310 a second code instead of the first code to third party entity 308.

In contrast to legacy eCommerce transaction, steps 306 and 310 do not provide merchant 304 with the personal registration or confidential financial information of consumer 302. Merchant 304 is unaware of financial information belonging to consumer 302 that is usable for conducting another eCommerce transaction. The barrier to eCommerce transaction with an unfamiliar entity is removed because third party entity 308, acting as a broker, is a trusted and familiar entity to consumer 302. Hence, consumer 302 may shop with more confidence even though merchant 304 may be an unfamiliar entity since no personal registration or confidential financial information is submitted to an unfamiliar eCommerce merchant 304.

In accordance with an embodiment of the invention, third party entity 308 may contact consumer 302 in step 312 after receiving the transaction information from merchant 304 to get a confirmation of the transaction in step 314 from consumer 302. Third party entity 308 may contact consumer 302 through a channel physically different from the original channel to verify the identification of consumer 302 to minimize fraudulent practices such as identity theft. For example, the verification channel may be a telephone network or a data network in accordance with an embodiment of the invention.

Consider the case wherein, for example, a confirmation message may be set up by consumer 302 with third party entity 308 such that a notification without any response required may be used for a low dollar purchase. A notification with response within a specified time may be required, for transactions exceeding a specified dollar amount or the transaction may be voided if there is no response within the specified time. Alternatively or additionally, for a larger dollar transaction, an interactive response may be required with the confirmation message or else the transaction may be voided.

Furthermore, in accordance with an embodiment of the invention, the ID of consumer 302 may be further verified in the confirmation step. In one embodiment, consumer 302 may receive a confirmation request from third party entity 308 to accept the charge for the transaction and provide the optional verification. For example, consumer 302 may be requested to provide a unique password to verify the account ID number. In another example, third party entity 308 may employ automated speech pattern recognition software to match the voice of consumer 302 on the telephone with the voice data from the database. One skill in the art would appreciate, given this disclosure, that alternative authentication method(s) may be employed to verify consumer 302 identity to associate the transaction with the confidential information in the database.

In contrast to prior art eCommerce transaction technique, the verification and confirmation of steps 312 and 314 provides consumer 302 with a complete assurance of pricing integrity, wherein consumer 302 may be made fully aware of the pending charge before authorizing the transaction. Furthermore, the optional ID verification may provide consumer 302 with enhanced protection from fraudulent uses by identity thieves. Hence, consumer 302 may shop with more confidence with unfamiliar eCommerce entity because third party entity 308, acting as a broker, is performing the verification of consumer ID and transaction charge, in the implementation of FIG. 3.

In an embodiment of the invention, third party entity 308, after performing the verification and receiving confirmation from consumer 302, may send in step 316 the confirmation and shipping codes to merchant 304. Consider the case wherein, for example, consumer 302 approves the transaction charge and an approval confirmation code is sent by third party entity 308 to merchant 304. In accordance with an embodiment of the invention, consumer 302 may be charged the approved transaction amount by third party entity 308 using the preferred payment method from the database containing confidential financial information. Merchant 304 may be paid by third party entity 308 for the eCommerce transaction of consumer 302. Hence, consumer 302 may shop with high level of confidence even with unfamiliar entity since confidential information does not have to be provided to an unfamiliar entity to accomplish eCommerce transaction.

Merchant 304, in one embodiment, may receive the confirmation and preferred shipping information from third party entity 308 after consumer 302 approves the transaction charge. Merchant 304 may send in step 318 goods to the shipping address selected by consumer 302. In the implementation of FIG. 3, consumer 302 may not care to be disassociated from the merchandise but may only need to protect the personal registration and confidential financial information from the potential identity theft or fraudulent use risks associated with an unfamiliar eCommerce merchant.

As can be appreciated from the foregoing, embodiments of the invention afford consumers, through a third party entity, techniques and mechanisms to protect their anonymity as well as therein personal information and financial information since such information is not provided to the merchant. Therefore, consumers are able to shop with confidence, even with merchants that are not well-known. Third party entity provides a separate channel for verification of information, thereby adding another layer of security to minimize identity theft. Consumers may also shop with confidence because they are able to confirm the pricing integrity in complete anonymity and before the transaction is finalized. From the merchant's standpoint, merchants have the confidence that they will get paid even though consumers are anonymous because the third party entity in effect guarantees that the merchant will get paid once a consumer confirms the transaction.

While this invention has been described in terms of several preferred embodiments, there are alterations, permutations, and equivalents, which fall within the scope of this invention. Also, the title, summary, and abstract are provided herein for convenience and should not be used to construe the scope of the claims herein. It should also be noted that there are many alternative ways of implementing the methods and apparatuses of the present invention. Although various examples are provided herein, it is intended that these examples be illustrative and not limiting with respect to the invention. Further, in this application, a set of "n" items refers zero or more items in the set. It is therefore intended that the following appended claims be interpreted as including all such alterations, permutations, and equivalents as fall within the true spirit and scope of the present invention.

What is claimed is:

1. A method of facilitating an eCommerce transaction between a consumer and an eCommerce merchant site via a third party entity, comprising:
    receiving, by said eCommerce merchant site, a selection of goods for purchase and a first code from said consumer for a transaction;
    transmitting at least a second code from said eCommerce merchant site to said third party entity to request confirmation from said third party entity of said eCommerce transaction;
    receiving, by said eCommerce merchant site, said confirmation from said third party entity after said third party entity, upon receiving the second code from the eCommerce merchant site, has contacted the consumer to get a confirmation of the transaction, wherein the consumer is required to verify an identification in the confirmation;
    receiving, by said eCommerce merchant site, a shipping code when the confirmation indicates that said consumer has approved, via said third party, said eCommerce transaction;
    only if said confirmation indicates that said consumer has approved, via said third party entity, said eCommerce transaction, providing, by said eCommerce merchant site, the shipping code to a shipping entity, wherein said eCommerce merchant site is unaware of financial information belonging to said consumer that is usable for conducting another transaction and wherein said merchant is unaware of at least one of identity of said consumer and a shipping data that is specific to said consumer; and
    receiving by said eCommerce merchant site, payment for said eCommerce transaction from said third party entity.

2. The method of claim 1 wherein said merchant is unaware of both said identity of said consumer and the shipping data that is specific to said consumer.

3. The method of claim 1 wherein said shipping data that is specific to said consumer is at least one of a home address or a business address of said consumer.

4. The method of claim 1 further comprising requiring the confirmation from the consumer within a pre-determined period of time.

5. The method of claim 1 wherein the shipper entity is other than said third party entity and the shipping code or a derivative thereof is received from said one of said third party entity and said consumer.

6. The method of claim 1 wherein said shipping represents at least shipping to said third party entity to enable said third party entity to forward said goods to said consumer.

7. The method of claim 1 wherein said second code is the same as said first code.

8. A tangible computer-readable medium for storing computer-readable code for facilitating an eCommerce transaction between a consumer and an eCommerce merchant site via a third party entity, the code, when executed, to cause a machine to at least:
    receive at said eCommerce merchant site, a selection of goods for purchase and a first code from said consumer for a transaction;
    transmit at least a second code from said eCommerce merchant site to said third party entity to request confirmation from said third party entity of said eCommerce transaction;
    receive at said eCommerce merchant site, said confirmation from said third party entity after said third party entity, upon receiving the second code from the eCommerce merchant site, has contacted the consumer to get a confirmation of the transaction, wherein the consumer is required to verify an identification in the confirmation;
    receive at said eCommerce merchant site, a shipping code only if said confirmation indicates that said consumer has approved, via said third party entity, said eCommerce transaction;
    facilitate shipping, by said eCommerce merchant site, said goods only if said confirmation indicates that said consumer has approved, via said third party entity, said eCommerce transaction, and provide, by said eCommerce merchant site, the shipping code to a shipping entity, wherein said eCommerce merchant site is unaware of at least one of identity of said consumer and a shipping data that is specific to said consumer; and
    receive at said eCommerce merchant site payment for said eCommerce transaction from said third party entity.

9. The computer-readable medium of claim 8 wherein said eCommerce merchant site is unaware of both said identity of said consumer and shipping data that is specific to said consumer.

10. The computer-readable medium of claim 8 wherein said shipping data that is specific to said consumer is at least one of a home address or a business address of said consumer.

11. The computer-readable medium of claim 8 wherein the code further causes the machine to require the confirmation from the consumer within a pre-determined period of time.

12. The computer-readable medium of claim 8 wherein said shipper entity is other than said third party entity and the shipping code or a derivative thereof is received from said one of said third party entity and said consumer.

13. The computer-readable medium of claim 8 wherein said shipping represents at least shipping to said third party entity to enable said third party entity to forward said goods to said consumer.

14. The computer-readable medium of claim 8 wherein said second code is the same as said first code.

15. A method of facilitating a transaction between a consumer and an eCommerce merchant site, said transaction representing a purchase of goods or service from said eCommerce merchant site, said method being performed by a third party entity, said third party entity is an entity other than said consumer and said eCommerce merchant site, comprising:

receiving a first code from said eCommerce merchant site, said first code being associated with said consumer in a database;

receiving at least one of a transaction amount and an identification of said goods or service from said eCommerce merchant site for a transaction;

confirming while said transaction is pending, via at least one of a telephone network and a data network, with said consumer to obtain one of an approval and a denial by said consumer for said transaction wherein the consumer is required to verify an identification in the confirmation;

if said approval is obtained from said consumer for said transaction, and if the consumer has verified the identification, transmitting an indication of said approval to said eCommerce merchant site thereby enabling said eCommerce merchant site to complete said transaction;

transmitting a shipping code to the eCommerce merchant site when the indication of said approval is transmitted;

receiving the shipping code from a shipper entity, said shipper entity obtaining said the shipping code from said merchant in connection with said merchant providing said goods to said shipper entity to be shipped;

looking up shipping data for said consumer using said shipping code;

transmitting said shipping data to said shipper entity, said shipping data representing at least one of a name and a shipping data for said consumer, whereby said shipping data is not furnished by said consumer to said merchant to conduct said transaction, thereby rendering said merchant unaware of said shipping data for said consumer; and transmitting to said eCommerce merchant payment for said transaction.

16. The method of claim 15 wherein neither said first code nor said shipping code contains information that identifies said name and said shipping data for said consumer to said merchant.

17. The method of claim 15 wherein said first code is different from said shipping code and wherein neither said first code nor said shipping code contains information that identifies said name and said shipping data for said consumer to said merchant.

18. The method of claim 15 wherein said shipping data that is specific to said consumer is at least one of a home address or a business address of said consumer.

19. The method of claim 15 further comprising requiring the confirmation from the consumer within a pre-determined period of time.

20. The method of claim 15 wherein said shipping entity is other than said third party entity.

21. The method of claim 15 wherein said shipping entity is the same as said third party entity.

* * * * *